(12) United States Patent
Leoncavallo

(10) Patent No.: US 12,320,680 B2
(45) Date of Patent: Jun. 3, 2025

(54) METHOD FOR DYNAMIC ERROR COMPENSATION OF A POSITION SENSOR AND POSITION SENSOR WITH DYNAMIC ERROR COMPENSATION

(71) Applicant: Renesas Electronics America Inc., Milpitas, CA (US)

(72) Inventor: Ruggero Leoncavallo, Gratkorn (AT)

(73) Assignee: Renesas Electronics America Inc., Milpitas, CA (US)

( * ) Notice: Subject to any disclaimer, the term of this patent is extended or adjusted under 35 U.S.C. 154(b) by 260 days.

(21) Appl. No.: 17/970,161

(22) Filed: Oct. 20, 2022

(65) Prior Publication Data

US 2023/0136373 A1    May 4, 2023

(30) Foreign Application Priority Data

Oct. 28, 2021   (EP) .................................... 21205277

(51) Int. Cl.
   *G01D 5/244*   (2006.01)
   *G01D 5/18*    (2006.01)
(52) U.S. Cl.
   CPC ......... *G01D 5/24471* (2013.01); *G01D 5/183* (2021.05)
(58) Field of Classification Search
   CPC ............................ G01D 5/183; G01D 5/24471
   USPC .................................................... 73/862.625
   See application file for complete search history.

(56) References Cited

U.S. PATENT DOCUMENTS

2019/0238161 A1*   8/2019   Gustafsson ........ G01D 5/24495

OTHER PUBLICATIONS

Extended European Search Report dated May 9, 2022 issued in EP 21205277.3.

* cited by examiner

*Primary Examiner* — Nathaniel T Woodward
(74) *Attorney, Agent, or Firm* — SCULLY, SCOTT, MURPHY & PRESSER, P.C.

(57) ABSTRACT

A method for dynamic error compensation of a position sensor and a position sensor are disclosed. In the method, a calculated speed of a moving target for a current determined position is compared to a calculated running average of the speed of the moving target over a certain number of determined positions and if the calculated speed of the moving target for the current position is within a first window around the calculated running average of the speed of the moving target over the certain number of determined positions the dynamic angle error is not re-calculated for the current determined position, and/or if the calculated speed of the moving target for the current determined position exceeds a second window the previously calculated running average is deleted and the calculation of the running average of the speed of the moving target over a certain number of determined positions is restarted.

10 Claims, 1 Drawing Sheet

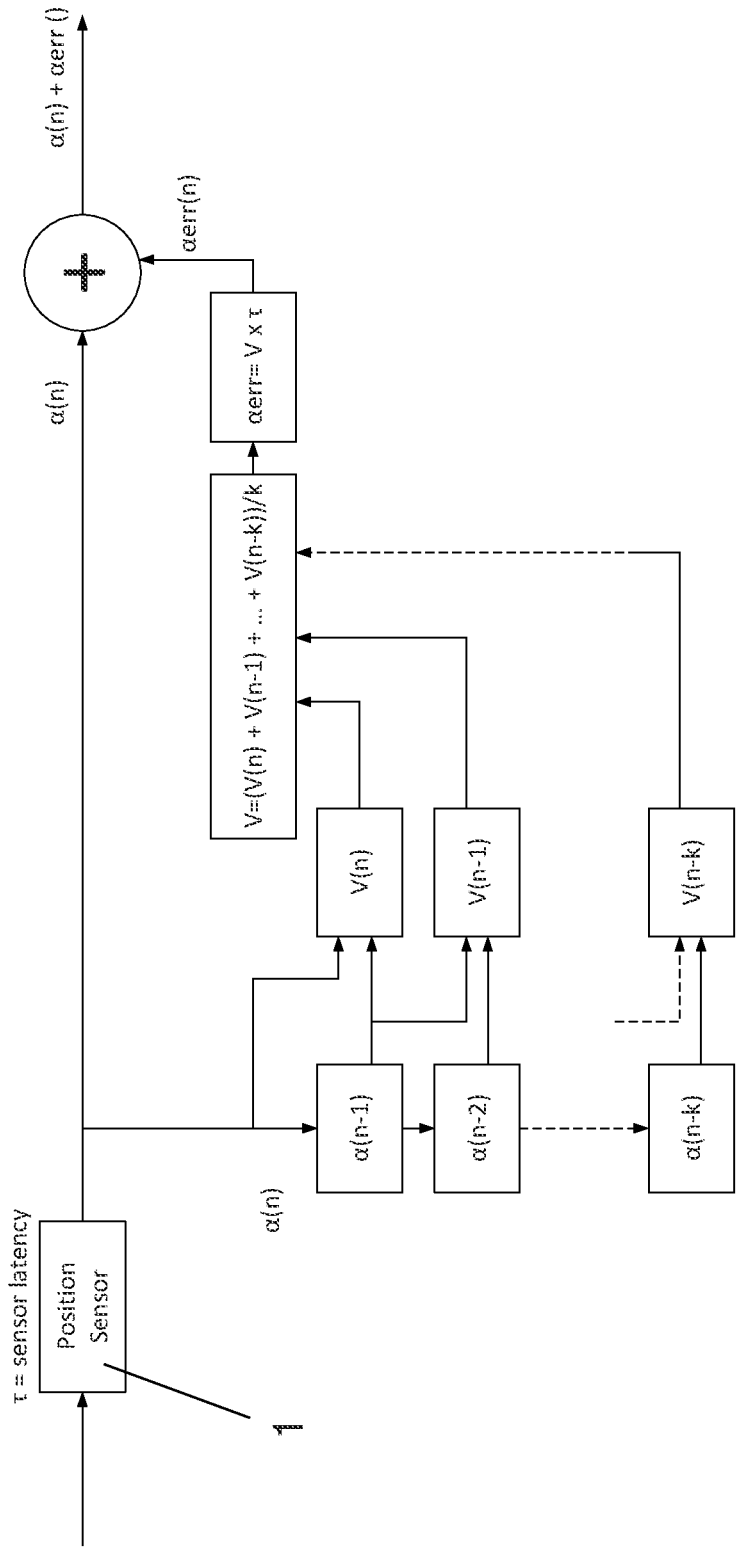

METHOD FOR DYNAMIC ERROR COMPENSATION OF A POSITION SENSOR AND POSITION SENSOR WITH DYNAMIC ERROR COMPENSATION

CROSS-REFERENCE TO RELATED APPLICATION

The subject application claims priority to European Patent Application No. 21205277.3, filed on Oct. 28, 2021. The entire disclosure of European Patent Application No. 21205277.3 is incorporated into the subject application by this reference.

BACKGROUND

Field

A method for dynamic error compensation of a position sensor is described. A position sensor with dynamic error compensation is further described.

Description of the Related Art

Position sensors, like rotating position sensors, usually comprise a sensing circuit and a control circuit, wherein the control circuit processes the signals of the sensing circuit to determine the position of a moving target. For example, the sensing circuit of an inductive position sensor comprises a transmitter coil and two receiving coils, such as a sine coil and a cosine coil. The moving target may be conductive and can move relative to the transmitter coil and receiver coils, thereby partly covering the transmitter coil and receiver coils. A radiofrequency signal is applied to the transmitter coil and the receiver coils receive a signal from the transmitter coil which changes with respect to the position of the moving target. The control circuit uses the signals of the receiver coils to calculate the current position of the moving target.

Every position sensor takes some time to measure and calculate the position of the moving target. This latency time is for example indicated as $\tau$. At time t the measurement of the position starts the moving target is located at position $p_0$. At the end of the calculation $t+\tau$, the moving target is located at position $p_1$. The dynamic error of the position sensor is defined as by $p_{err}=V*\tau$, wherein V is the average speed of the moving target. For a rotating position sensor, $p_0=\alpha_0$ and $p_1=\alpha_1$ and $p_{err}=\alpha_{err}$ and V is the rotating average speed.

The position sensor provides a new sample with a certain sampling frequency and the speed of the target can be calculated as derivative of two consecutive sensed positions, e.g., $\Delta p=p_{(n)}-p_{(n-1)}$ and $\Delta t=$sampling frequency or $\Delta\alpha=\alpha_{(n)}-\alpha_{(n-1)}$ and $\Delta t=$sampling frequency. Thus, the position error $p_{err}$ can be calculated by $p_{err}=V*\tau$ respectively the angular position error $\alpha_{err}$ by $\alpha_{err}=V*\tau$. Usually the latency $\tau$ consists of a base value coming from the analog blocks and a contribution which is proportional to the sampling time, wherein the latter can be totally compensated.

Each determination of the position of the moving target is affected by noise. But the calculation of the dynamic error for compensation also introduces additional noise. To reduce the noise contribution of the dynamic error compensation according to U.S. Pat. No. 9,952,065 B2 a running average of the speed of the moving target is calculated based on the last k samples. The larger k is chosen, the better is the noise suppression due to the calculated running average. However, in case of a change of the speed of the moving target, the position sensor will provide wrong position results until the calculated running average corresponds to the actual speed of the moving target.

It may be an object to reduce the dynamic error of position sensors for moving targets with a constant speed and be reactive in case of a change of the speed of the moving target.

SUMMARY

A method for dynamic error compensation of a position sensor, comprises:
determining a position of a moving target by the position sensor with a certain sampling frequency,
calculating the speed of the moving target for each determined position,
calculating a running average of the speed of the moving target over a certain number of determined positions, and
calculating a dynamic angle error on basis of the calculated running average of the speed, wherein the calculated dynamic angle error is used to correct the output of the position sensor,
wherein:
the current speed of the moving target calculated from the last two consecutive samples is compared to the calculated running average of the speed of the moving target over the certain number of determined positions and if the calculated speed of the moving target for the current position is within a first window around the calculated running average of the speed of the moving target over the certain number of determined positions the last dynamic angle error is frozen and will be used instead of a re-calculated dynamic angle error for the current determined position, and/or if the calculated speed of the moving target for the current position exceeds a second window around the calculated running average of the speed of the moving target over the certain number of determined positions the last dynamic angle error is replaced by the re-calculated one on basis of the current calculated speed of the moving target and the previously calculated running average is deleted and the calculation of the running average of the speed of the moving target over a certain number of determined positions is restarted. If the calculated speed exceeds the first window around the running average of the speed of the moving target and is within the second window the running average speed of the moving target is updated to include the current calculated speed and the dynamic angle error will be re-calculated on basis of the updated running average of the speed of the moving target.

Pursuant to the method, the position of a moving target is determined by the position sensor with a certain sampling frequency. In the next step, the speed of the moving target is calculated for each determined position, i.e., each sample according to the certain sampling frequency. Based on these calculated speeds, a running average of the speed of the moving target is calculated over a certain number of determined positions, i.e., samples. On basis of the calculated running average a dynamic angle error can be calculated, which is used to correct the output of the position sensor. This corresponds to the prior art, as for example disclosed in U.S. Pat. No. 9,952,065 B2.

The method further comprises comparing the calculated speed of the moving target for the current determined position, i.e., sample, to the calculated running average of the moving target over the certain number of determined positions.

If the calculated speed of the moving target for the current position is within a first window around the calculated running average of the speed of the moving target over the certain number of determined positions the dynamic angle error is frozen and not updated on basis of the current calculated speed of the moving target. Since the calculated speed of the moving target for the current position is within the first window around the calculated running average of the speed of the moving target over the certain number of determined positions the speed of the moving target has not significantly changed and a re-calculation of the dynamic angle error and the average speed of the moving target is not necessary. Thus, the error introduced by the calculation of the dynamic angle error is avoided. In other words, in this variant, the dynamic angle error is frozen as long as the speed of the moving target does not change significantly. In a first variant, the running average of the speed of the moving target is not updated using the calculated speed of the moving target for the current position. In a second variant, the running average of the speed of the moving target may be further monitored and updated over the certain number determined positions, i.e., samples, and change over time.

If the calculated speed of the moving target for the current determined position exceeds a second window the previously calculated running average is deleted and the calculation of the running average of the speed of the moving target over a certain number of determined positions is restarted. Since the calculated speed of the moving target for the current determined position exceeds the second window the speed of the moving target has changed significantly and in this case the running average is deleted, i.e., set to zero, and calculated from the beginning over the next consecutive samples. Furthermore, the calculated speed of the moving target for the current determined position, i.e., the newly started running average of the speed of the moving target, is used to determine the dynamic angle error to compensate the angular position. This avoids that the calculated dynamic angle error is calculated on basis of a running average that mainly bases on a non-actual speed of the moving target. Thus, the method is reactive to a change of the speed of the moving target.

If the calculated speed of the moving target for the current determined position exceeds the first windows and is within the second window, the running average of the speed of the moving target is updated to include the calculated speed of the moving target for the current determined position. This updated running average of the speed of the moving target is used to re-calculate the dynamic angle error to compensate the angular position.

In a variant, determining the position of the moving target by the position sensor comprises the step of sensing and calculating the position of the moving target. The used position sensor usually comprises a sensing circuit, as for example disclosed in the introductory part, and a control circuit for calculating the position of the moving target from the signals received from the sensing circuit. The calculation is reduced in case the speed of the moving target is approximately constant, i.e., within the first window.

Pursuant to a variant, the dynamic angle error of the position sensor relates to the time for determining, such as sensing and calculating, the current position of the moving target and calculating the dynamic angle error. The additional noise introduced by the calculation of the dynamic angle error is avoided as long as the speed of the moving target does not exceed the first window, i.e., is substantially constant.

According to a variant, the position sensor is a rotational position sensor and the method compensates the dynamic angle error of the rotational position sensor.

Pursuant to a variant, the first window is smaller than the second window. Thus, the dynamic angle error is calculated on basis of the calculated running average if the calculated speed of the moving target for the current determined position is greater than the first window and smaller than the second window.

In an example, the first window corresponds to a substantially constant speed of the moving target and the second window corresponds to a substantial change of the speed of the moving target. As the speed is calculated as the derivative of the position and as the position itself is affected by noise, also the speed will be affected by noise. The first window might be set, for example, as 120% of the 3 sigma of the noise of the speed, while the second window could be 200% of the 3 sigma of the noise of the speed.

Pursuant to a variant, the speed of the moving target for each determined position is calculated on basis of the current and previous determined position of the moving target by the position sensor.

In this variant, the difference between two consecutive determined positions is calculated and since the sampling frequency is known, the speed of the moving target can be easily calculated.

The object is further solved by a position sensor, such as a rotating position sensor, comprising a sensing circuit and a control circuit, wherein the control circuit implements the method described.

BRIEF DESCRIPTION OF THE DRAWINGS

An embodiment will be further explained with reference to the FIGURE. The FIGURE shows a schematic view of a rotational position sensor implementing the method according to one embodiment.

DETAILED DESCRIPTION

The FIGURE shows a schematic view of a position sensor (1) implementing the method for dynamic error compensation of the position sensor (1) according to an embodiment. The rotational positions sensor (1) may comprise a sensing circuit and a control circuit, wherein the control circuit implements the method. In a first step, a position ($\alpha$) of a moving target is determined by the rotational position sensor (1) with a certain sampling frequency (n, k). The step of determining the position ($\alpha$) of the moving target by the position rotational sensor (1) can comprise the step of sensing and calculating the position of the moving target. For each determined position ($\alpha_{(n)}$), the speed ($V_{(n)}$) of the moving target is calculated. The speed ($V_{(n)}$) of the moving target for each determined position ($\alpha_{(n)}$) is for example calculated on basis of the current ($\alpha_{(n)}$) and previous ($\alpha_{(n-1)}$) determined position of the moving target by the position sensor (1). Afterwards a running average (V) of the speed of the moving target over a certain number of determined positions ($\alpha_{(n)}$) is calculated. On basis of the calculated running average (V) a dynamic angle error ($\alpha_{err}$) is calculated, which is used to correct the output of the position sensor (1). The dynamic angle error ($\alpha_{err}$) of the position sensor (1) relates to the time ($\tau$) for determining, such as sensing and calculating, the current position ($\alpha$) of the moving target. Since the FIGURE refers to a rotational position sensor (1), the method compensates the dynamic angle error ($\alpha_{err}$) of the rotational position sensor (1).

The current speed ($V_{(n)}$) of the moving target for the current determined position ($\alpha_{(n)}$) calculated from the last two consecutive samples is compared to the calculated running average (V) of the speed of the moving target over the certain number of determined positions ($\alpha$) and if the calculated speed ($V_{(n)}$) of the moving target for the current position ($\alpha_{(n)}$) is within a first window around the calculated running average (V) of the speed of the moving target over the certain number of determined positions ($\alpha$) the last dynamic angle error ($\alpha_{err}$) is frozen and will be used instead of a re-calculated dynamic angle error ($\alpha_{err}$) for the current determined position ($\alpha_{(n)}$), and/or if the calculated speed ($V_{(n)}$) of the moving target for the current determined position ($\alpha_{(n)}$) exceeds a second window the previously calculated running average (V) of the speed of the moving target over the certain number of determined positions ($\alpha$) the last dynamic angle error ($\alpha_{err}$) is replaced by the re-calculated one on basis of the current calculated speed ($V_{(n)}$) of the moving target and the previously calculated running average (V) of the speed of the moving target over a certain number of determined positions ($\alpha$) is restarted.

If the calculated speed ($V_{(n)}$) of the moving target exceeds the first window around the running average of the speed of the moving target and is within the second window the running average speed of the moving target is updated to include the current calculated speed ($V_{(n)}$) and the dynamic angle error ($\alpha_{err}$) will be re-calculated on basis of the speed according to the running average (V) of the speed of the moving target.

In an embodiment, the first window is smaller than the second window and the dynamic angle error ($\alpha_{err}$) is calculated on basis of the of the calculated running average (V) if the calculated speed ($V_{(n)}$) of the moving target for the current determined position ($\alpha_{(n)}$) is greater than the first window and smaller than the second.

For example, the first window corresponds to a substantially constant speed ($V_{(n)}$) of the moving target and the second window corresponds to a substantial change of the speed ($V_{(n)}$) of the moving target. For example, the first window is defined as 120% of the 3 sigma of the noise of the speed ($V_{(n)}$) of the moving target and the second window is defined as 200% of the 3 sigma of the noise of the speed ($V_{(n)}$) of the moving target.

What is claimed is:

1. A method for dynamic error compensation of a position sensor, comprising:
   determining a position of a moving target by the position sensor with a certain sampling frequency,
   calculating a speed of the moving target for each determined position,
   calculating a running average of the speed of the moving target over a certain number of determined positions,
   calculating a dynamic angle error for each determined position on basis of the calculated running average of the speed, wherein the calculated dynamic angle error is used to correct an output of the position sensor,
   determining a first condition where the calculated speed of the moving target for a current determined position is within a first window around the calculated running average of the speed of the moving target over the certain number of determined positions;
   in response to determining the first condition, maintaining the dynamic angle error;
   determining a second condition where the calculated speed of the moving target for the current determined position is within a second window around the calculated running average of the speed of the moving target over the certain number of determined positions; and
   in response to determining the second condition, re-calculating the dynamic angle error by deleting the dynamic angle error and calculating a new dynamic angle error to correct the output of the position sensor.

2. The method according to claim 1, wherein the determining the position of the moving target by the position sensor comprises the sensing and calculating the position of the moving target.

3. The method according to claim 1, wherein the dynamic angle error of the position sensor relates to a time for sensing and calculating the current determined position of the moving target.

4. The method according to claim 1, wherein the position sensor is a rotational position sensor and the method compensates the dynamic angle error of the rotational position sensor.

5. The method according to claim 1, wherein the first window is smaller than the second window.

6. The method according to claim 5, wherein the dynamic angle error is calculated on basis of the of the calculated running average if the calculated speed of the moving target for the current determined position is greater than the first window and smaller than the second window.

7. The method according to claim 1, wherein the first window is smaller than a first ratio of the calculated running average of the speed of the moving target over the certain number of determined positions.

8. The method according to claim 1, wherein the second window is greater than a second ratio of the calculated running average of the speed of the moving target over the certain number of determined positions.

9. The method according to claim 1, wherein the speed of the moving target for each determined position is calculated on basis of the current determined position and a previous determined position of the moving target by the position sensor.

10. A position sensor comprising:
    a sensing circuit and a control circuit, wherein the control circuit implements the method according to claim 1.

* * * * *